Patented June 24, 1930

1,765,737

UNITED STATES PATENT OFFICE

JAMES B. PIERCE, JR., OF CHARLESTON, WEST VIRGINIA

BARIUM SULPHATE AND METHOD OF MAKING SAME

No Drawing. Application filed November 10, 1924. Serial No. 749,025.

This invention relates to the production of barium sulphate of the quality commonly termed blanc fixe and certain by-products from such manufacture and has for its principal objects the economical and expeditious production of highly porous barium sulphate, the particles of which are of microscopic fineness, which product is not only extremely free from impurities, but is capable of forming a complex with titanium hydroxide or oxide as well as having other advantages hereinafter referred to.

In the production of my improved blanc fixe, I preferably proceed as follows:

Substantially pure carbon di-oxide gas and substantially pure sodium sulphate liquor are first prepared in accordance with the well known method by the interaction of nitre cake (acid sodium sulphate) or sulphuric acid upon soda ash in accordance with the following equation:

$$2NaHSO_4 + Na_2CO_3 = 2Na_2SO_4 + CO_2 + H_2O$$

The carbon di-oxide gas so generated is caused to pass into a hot concentrated barium sulphide liquor of preferably 16% to 24% strength, whereby a precipitate of barium carbonate of high purity and a top liquor of barium sulphydrate are formed in accordance with the following equation:

$$2BaS + CO_2 + H_2O = BaCO_3 + Ba(SH)_2$$

The latter is decanted off and the precipitate is then washed in the usual manner by decantation, then filtered in a suitable filter press, dried and disintegrated. The top liquor of barium sulphydrate of from 7% to 14% strength and while at a temperature of from 50° C. to 70° C. is then treated with the aforesaid pure sodium sulphate liquor of from 20% to 30% strength heated to from 50° C. to 90° C. to which mixture is added a small amount of sodium sulphide or sodium sulphydrate in order to further purify the same. The resultant reaction produces a precipitate of finely divided amorphous barium sulphate (blanc fixe) and a top liquor of sodium sulphydrate, which latter is decanted off and evaporated to a marketable strength, for example, in excess of 30% sodium sulphydrate content, such reaction being represented by the following equation:—

$$Ba(SH)_2 + Na_2SO_4 = BaSO_4 + 2NaSH$$

The precipitated barium sulphate so obtained is freed by washing from the sodium sulphydrate and other compounds of sodium and sulphur which are present due to oxy-sulphur compounds of barium ordinarily contained in the barium sulphide liquor but which impurities, being highly water soluble, either pass away with the top liquor or with the wash water. If desired, an absolutely neutral blanc fixe, free from sodium sulphide, may be obtained, following the removable by washing of the sulphur and sodium compounds, by the addition of an oxidizing agent, such as hydrogen peroxide which affects the ready oxidation of all the sulphide or oxy-sulphur compounds of soda into sulphate that is also removable by washing. Such neutral blanc fixe is then separated, made into a marketable condition by filtering, drying and then disintegrating the precipitate so obtained.

In order to produce sodium sulphide from the decanted sodium sulphydrate liquor, the molecular weight of caustic soda is added thereto and the reaction occurs in accordance with the following equation:

$$NaSH + NaOH = Na_2S + H_2O$$

Obviously if there is insufficient carbon dioxide from the reaction between nitre cake and soda ash to carry out the cycle in balance due either to variation in acidity of the nitre cake, or any other reason, it can be secured from any extraneous source, such as flue gas, by the standard method of absorption of carbon dioxide content of the gas in lye (potassium or sodium carbonate) to form potassium or sodium bicarbonate, and then evolving the carbon dioxide by heating the solutions of the bicarbonates of potash and soda. Also it is evident that if more sodium sulphate liquor is required to carry out my cycle it can be secured from any usual source such as salt cake, or the carbon dioxide gas from the interaction of acid sodium sulphate (nitre cake) or sulphuric acid and soda ash can be wasted, the only requirement being that the sodium sulphate liquor must be substantially pure.

A careful observance of the foregoing conditions during the precepitation and washing of the barium sulphate will enable one to produce a practically neutral, or an absolutely neutral, sulphide free, precipitated barium sulphate (blanc fixe) of a pure white color, whose ultimate particles under the microscope appear spherical in shape and amorphous, rather than crystalline, and measure but from one to two micromillimeters in diameter.

My improved barium sulphate product, prepared in accordance with the foregoing procedure, will inevitably contain a fraction of a percent of sodium sulphate, usually from 0.1% to 0.5% in actual combination therewith, since the latter cannot be removed, either by washing with hot water or by mechanical means of separation. Apparently this is due to the fact that the barium sulphate has, through adsorption, or as a chemical complex, or by both these or other phenomena, entered into combination with the sodium sulphate. In the adsorption phenomena as described above, the sodium radical, $Na+$ and the $SO_4=$ radical, are not necessarily both adsorbed in their combining ratios. Usually the $Na+$ is in excess. Furthermore, my barium sulphate, when subjected to calcination at say 900° C., will shrink gradually until its bulk is but 50% to 75% of its bulk before calcination. While the specific gravity of the mass remains substantially unaffected by said calcination, its weight per given bulk is heavier. The calcination destroys the adsorptive power of the barium sulphate, and causes it to release the sodium sulphate adsorbed during the precipitation, as said sodium sulphate can be removed by water after calcination. Such unusual shrinkage on calcination can best be explained by the fact that the product being highly amorphous and porous, becomes crystalline and consequently occupies much less space after calcination.

The aforesaid uncalcined barium sulphate product is also not only of an extreme degree of fineness and remarkably free from foreign substances, especially alkaline, acid and neutral salts, and also iron, but it possesses in a remarkable degree the property of adsorbing other substances, to a much greater degree than blanc fixe such as has been heretofore produced, and furthermore, the ultimate particles of such barium sulphate, plus the dispersed substances, especially when such adsorbed substance is of a colloidal or highly dispersed nature, approximates but little, if any, increase in its microscopic dimensions over the original ultimate particles of barium sulphate. This is substantiated by microscopic examination of the barium sulphate after calcination at 900° C., which discloses that the calcined product is crystalline and not amorphous in character, and furthermore, the particles as seen under the microscope, are no longer regular in size and spherical in shape, but are irregular and of diverse shapes.

If my precipitated barium sulphate be mixed with a solution of a salt of titanium, say titanium sulphate in sulphuric acid, or a solution of titanic acid in sulphuric acid, and the titanium be hydrolyzed or precipitated as titanium hydroxide or titanic oxide, the said titanium hydroxide or titanic oxide will be adsorbed by the barium sulphate or may form a chemical complex, or both phenomena may occur.

The product resulting from the above mentioned procedure possesses neither the properties of titanium hydroxide or titanic oxide, nor of barium sulphate, since (a) It can be filtered, thus differentiating it from titanium hydroxide or titanic oxide; and (b) If the filtered cake be dried and then subjected to calcination, say at about 900° C. and the calcined product be examined microscopically, it will be found that no separate differentiation of the titanium compound from the barium sulphate can be observed, even under high degrees of magnification, say 1,000 diameters. Furthermore, the particles or the product are still amorphous and regular and spherical in shape, being very different from the particles of the barium sulphate when calcined without treatment with a titanium compound. Also, the particles of the titanium barium sulphate product are more opaque to light when observed under the microscope, than are the particles of the barium sulphate before treatment with the titanium compound. All this above phenomena can be explained by the barium sulphate adsorbing the titanium compound, whether in the form of sulphate, hydrate or other compound. It is evident that no chemical reaction can take place between titanium sulphate or hydroxide and barium sulphate. Therefore, we have left to explain the phenomena described under (a) as only adsorption or the formation of a chemical complex or the occurrence of some like phenomenon.

My improved barium sulphate product, in addition to the foregoing application, is peculiarly useful in the vulcanization of rubber, in which operation it can be substituted not only for all of the coarser blanc fixe which is at present employed, but also in part for the zinc oxide, it having been ascertained that from 25% to 50% of the zinc oxide, which would otherwise be required in conjunction with ordinary blanc fixe, can be dispensed with, when employing my improved product, notwithstanding the fact that when using coarser blanc fixe, it is not possible to substitute the same for part of such zinc oxide which is now required for such purposes.

While my preferred barium sulphate product has ultimate particles whose diameters will average less than two micromillimeters, and will form complexes, with titanic hydroxide or oxide for example, in which complexes the average diameter of the ultimate particles thereof does not greatly exceed two micromillimeters, I do not want to be understood as restricting myself to such limits, as even barium sulphate whose particles will increase in size up to 100% of their original bulk when forming such a complex, may, if it possesses the other desirable properties of my improved product as herein described, be suitable for my preferred product.

Having thus described my invention, what I claim and desire to obtain by United States Letters Patent is:

1. The process of making barium compounds and certain by-products which consists in causing substantially pure carbon dioxide gas to react upon barium sulphide liquor, of a strength of 18% to 24% barium sulphide content, to form precipitated barium carbonate and barium sulphydrate liquor, then causing the resultant barium sulphydrate liquor, of a strength of 7% to 14% of barium sulphydrate content, to react with sodium sulphate liquor to produce precipitated barium sulphate and sodium sulphydrate liquor and separately recovering the barium sulphate and the sodium sulphydrate so obtained.

2. The process of making precipitated pure barium sulphate and pure sodium sulphydrate, which consists in causing carbon dioxide gas to react on barium sulphide liquor to thereby produce precipitated barium carbonate and barium sulphydrate liquor, effecting the separation of the barium carbonate so formed from the barium sulphydrate liquor, then causing the barium sulphydrate liquor to react with pure sodium sulphate to produce precipitated barium sulphate and sodium sulphydrate.

3. The process of making pure barium sulphate and pure sodium sulphydrate, which consists in causing a substantially pure carbon dioxide gas to react with barium sulphide liquor to form precipitated barium carbonate and barium sulphydrate liquor, effecting the separation of the barium carbonate so formed from the barium sulphydrate liquor, then causing the barium sulphydrate liquor to react with pure sodium sulphate, forming precipitated barium sulphate and sodium sulphydrate.

4. The process of making pure barium sulphate and pure sodium sulphydrate and certain by-products, which consist in causing substantially pure carbon dioxide gas to react upon barium sulphide liquor to form precipitated barium carbonate and barium sulphydrate liquor, effecting the separation of the barium carbonate so formed from the barium sulphydrate liquor, then causing the barium sulphydrate liquor to react with pure sodium sulphate to produce precipitated barium sulphate and sodium sulphydrate liquor, decanting off the sodium sulphydrate liquor, then washing the precipitated barium sulphate substantially free of sodium sulphydrate and other salts of sodium and sulphur with pure water, and the last traces of salts of sodium and sulphur being oxidized to sodium sulphate by hydrogen peroxide and then removing the resulting sodium sulphate by washing with water.

Signed at Charleston, in the county of Kanawha and State of West Virginia, this 8th day of November, 1924.

JAMES B. PIERCE, Jr.